Oct. 18, 1960 R. E. J. NORDQUIST 2,956,660
CAN VENDING MACHINE
Filed Oct. 14, 1957 5 Sheets-Sheet 1

INVENTOR.
RONALD E. J. NORDQUIST
BY Charles H. Erne.
Leland R. McCann
George W. Reiber
ATTORNEYS

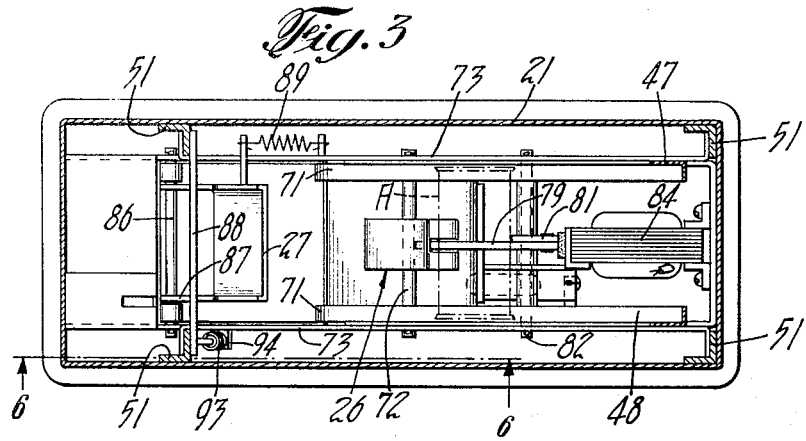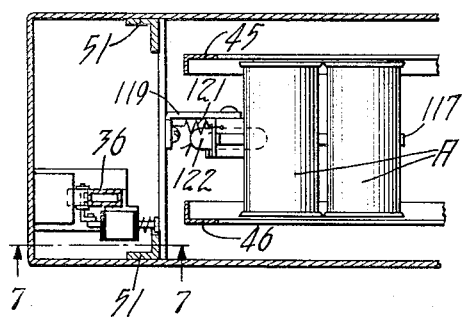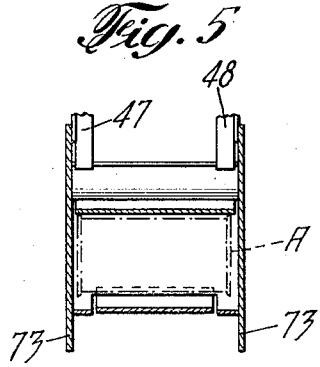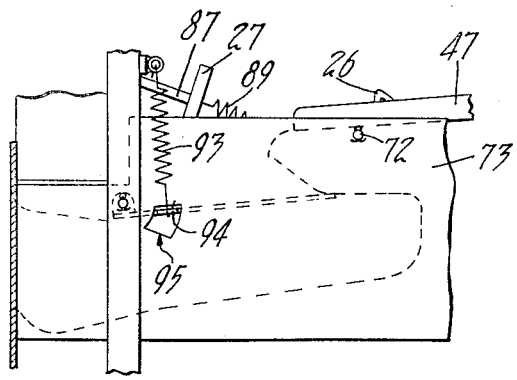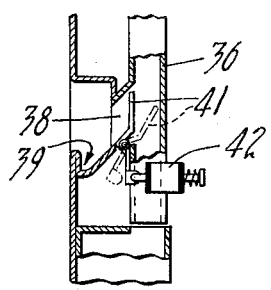

Oct. 18, 1960 — R. E. J. NORDQUIST — 2,956,660
CAN VENDING MACHINE
Filed Oct. 14, 1957 — 5 Sheets-Sheet 3
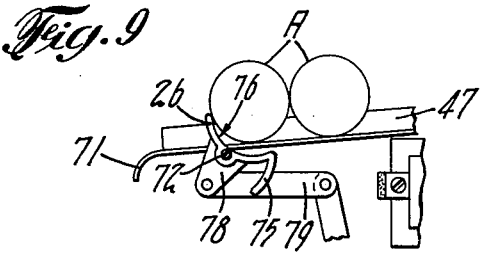
Fig. 9
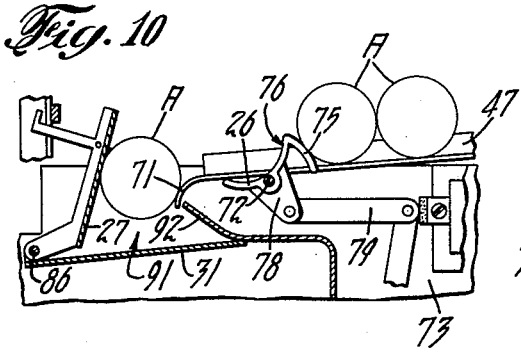
Fig. 10
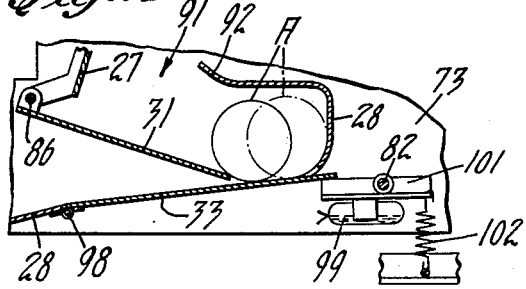
Fig. 11
Fig. 12
Fig. 8
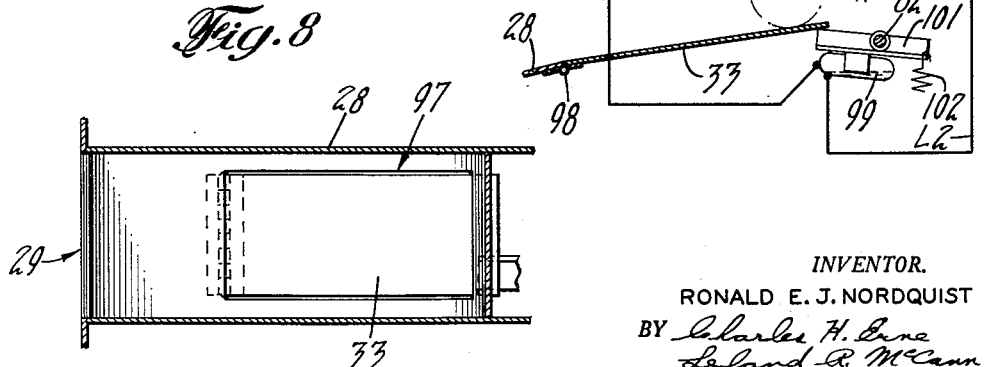
INVENTOR.
RONALD E. J. NORDQUIST
BY Charles H. Erne
Leland R. McCann
George W. Reiber
ATTORNEYS Oct. 18, 1960 R. E. J. NORDQUIST 2,956,660
CAN VENDING MACHINE
Filed Oct. 14, 1957 5 Sheets-Sheet 4

INVENTOR.
RONALD E. J. NORDQUIST
BY Charles H. Lane
Leland R. McCann
George W. Raber
ATTORNEYS

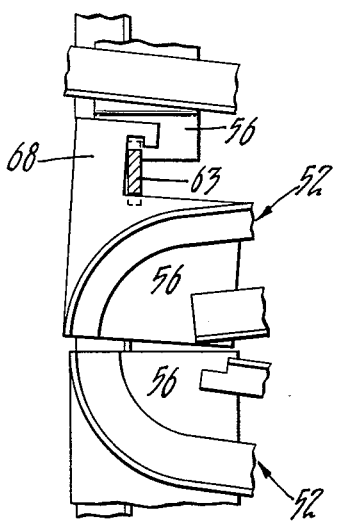
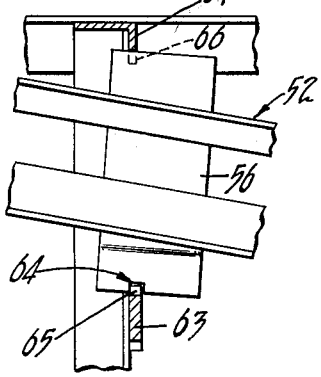
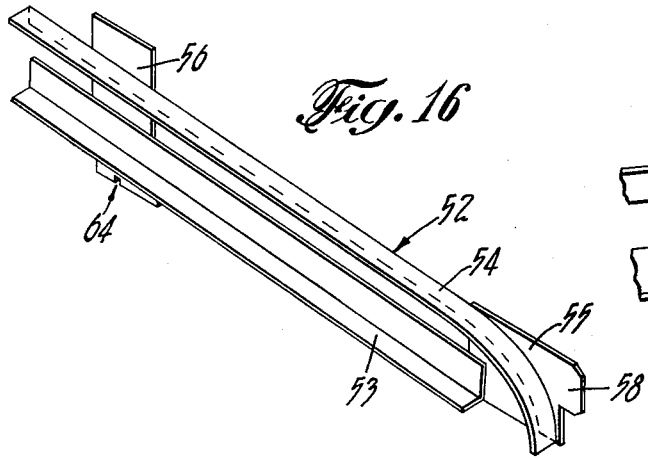
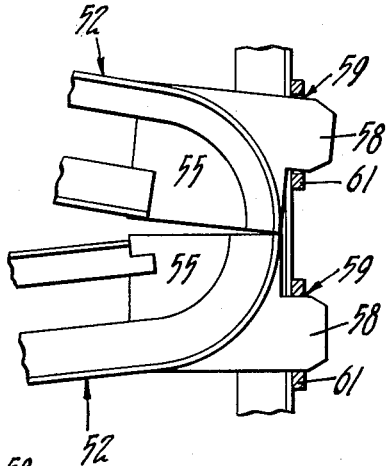
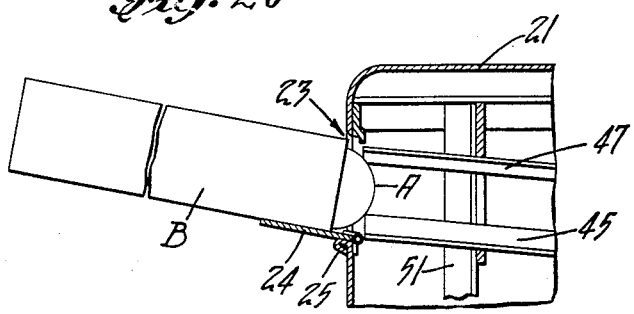
*INVENTOR.*
RONALD E. J. NORDQUIST
BY
ATTORNEYS United States Patent Office 2,956,660
Patented Oct. 18, 1960

2,956,660

CAN VENDING MACHINE

Ronald E. J. Nordquist, Summit, N.J., assignor to American Can Company, New York, N.Y., a corporation of New Jersey Filed Oct. 14, 1957, Ser. No. 689,849

4 Claims. (Cl. 194—2)

The present invention relates to a vending machine for dispensing cans or containers of beverages and the like liquids and has particular reference to a tamperproof release mechanism for such machines.

An object of the instant invention is to provide a can or container vending machine which is tamperproof so that release of the cans or containers therefrom can be effected only through the deposit of a proper coin therein.

Another object is to provide a can release mechanism through which the cans flow freely one at a time without becoming jammed in the mechanism and without jamming the mechanism itself against subsequent operation.

Another object is to provide for sufficient storage of cans in the machine and a gentle movement of the cans through the machine to and through the release mechanism so as to insure against undue agitation of the contents of the cans, especially carbonated contents in which excessive agitation causes release of gases from the contents and pressure build-up in the cans.

Another object is to provide for the easy loading of the cans into the machine, direct from a carton without individual can handling.

Another object is to provide for adjustment of parts of the machine for cans of different sizes.

Numerous other objects and advantages of the invention will be apparent as it is better understood from the following description, which, taken in connection with the accompanying drawings, discloses a preferred embodiment thereof.

Referring to the drawings:

Figs. 3, 4 and 5 are sectional views taken substantially along the respective lines 3—3, 4—4, 5—5 in Fig. 1, with parts broken away;

Fig. 6 is a sectional view taken substantially along the line 6—6 in Fig. 3, with parts broken away;

Fig. 7 is a sectional view taken substantially along the line 7—7 in Fig. 4, with parts broken away;

Fig. 8 is a sectional view taken substantially along the line 8—8 in Fig. 1, with parts broken away;

Figs. 9, 10 and 11 are schematic views of parts of the machine as shown in the lower portion of Fig. 1, the figures illustrating different stages in the dispensing of a container or other article from the machine;

Fig. 12 is a diagrammatic view illustrating principal parts of the machine and a connecting wiring diagram of the electric devices used in the machine;

Fig. 16 is an enlarged perspective view of one of the adjustable runway sections shown in Fig. 15;

Figs. 17, 18 and 19 are enlarged fragmentary sectional views taken substantially along the line 15—15 in Fig. 14 and showing the ends of the runway sections in positions for removing and/or adjusting the runway for different can heights; and Fig. 20 is a schematic sectional view of the upper portion of the machine shown in Fig. 1, the view showing how cans are loaded into the runway.

Figure 1:
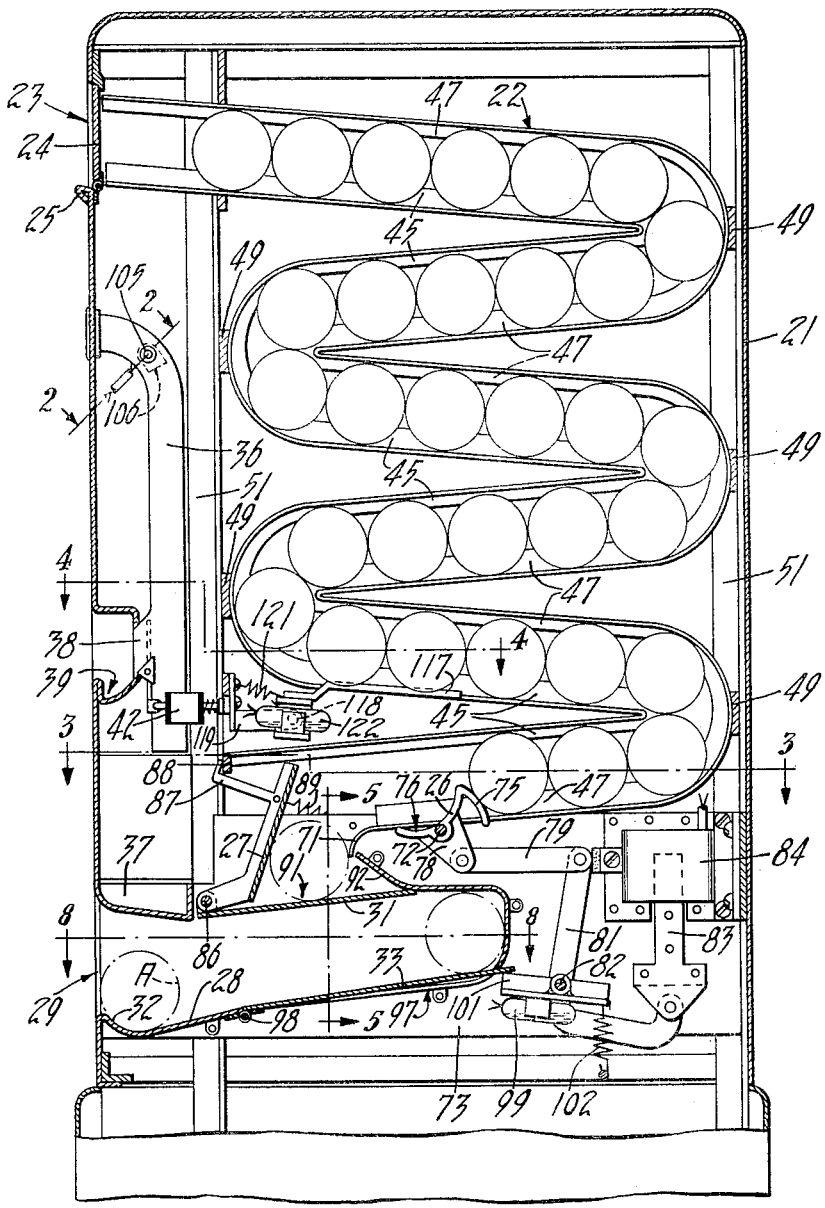
Figure 1 is a vertical sectional view through a dispensing machine embodying the instant invention.

As a preferred and exemplary embodiment of the instant invention the drawings disclose a vending machine for canned products, preferably carbonated beverages and the like, and which upon the insertion of a coin automatically dispenses or delivers one can and through a tamperproof release mechanism which insures against delivery of a can in any other manner.

The machine is not limited to cans containing carbonated beverages but is particularly adapted for such cans because of its gentle handling of the cans. Such gentle handling prevents undue agitation of the contents and in carbonated liquids prevents release of the gases from the product and thereby prevents excessive pressures in the cans which pressures often blow out the contents of the can when it is opened.

Such a machine preferably is entirely enclosed by a housing or casing 21 (Figs. 1 and 2) which serves as a frame for interiorly supporting various parts of the machine and which may be insulated to facilitate refrigeration of the cans within the casing.

Briefly the machine comprises three principal mechanisms: a can storing and feeding mechanism, a tamperproof can release mechanism, and a coin actuated control mechanism.

In the storage and feeding mechanism of the machine, cans A are fed into and roll on their sides along a zigzag runway 22 composed of a plurality of sections sloping in opposite directions one under the other from an inlet or entrance opening 23 in the front wall of the casing 21 near the top of the machine, to a terminal or discharge end near the bottom of the machine. This long runway serves as a storage space for a considerable number of cans.

A hinged door 24 provided in the inlet opening 23 in the casing 21 facilitates loading of the cans into the runway 22. The door 24 preferably is hinged along its lower edge so that it may be swung outwardly and downwardly. In this position, the door, supported by a lug 25 projecting from the casing 21, is utilized as a support for locating and partially supporting a carton B as shown in Fig. 20, to permit rolling of cans A direct from the carton into the runway without necessitating individual handling of the cans. This greatly facilitates loading of the machine and saves considerable labor and time.

The tamperproof can release mechanism is located at the terminal end of the runway 22 and briefly comprises an oscillatable can stop-release element 26 (Fig. 1), a resilient cushion pad 27 and a connecting downwardly and outwardly inclined delivery compartment or chute 28 which leads to a delivery or pick-off opening 29 in the front of the machine. Upon actuation of the stop-release element 26, one can is released and the others are held back. The released can resets the element. Release of the one can is cushioned by the pad 27. The cushioned can falls through a trap door 31 in the top of the delivery chute 28 and thus enters the chute and rolls gently down to the delivery opening 29 where it is stopped by a bumper 32 provided at the end of the chute.

Upon entering the delivery compartment or chute 28 the released can depresses a control arm or plate 33 which electrically renders the machine inoperative against the release of another can until the can in the delivery chute has been fully delivered. The delivery chute is fully enclosed and the trap door 31 and the control plate 33 are so arranged that attempt of manual actuation as by tampering through the delivery opening 29 is ineffective upon the can stop-release element and results in nothing more than rendering the machine inoperative.

The coin actuated control mechanism provides for actuation of the cam stop-release element 26 through deposit of a coin into a coin chute 36 leading from a slotted opening in the front of the casing 21 and extending down to a coin box 37 inside the machine. A short coin return chute 38 (see also Fig. 7) communicating with the coin chute 36 leads to an open coin return pocket 39 in the front of the casing 21. The entrance of the return chute 38 is normally closed by a pivotally mounted flapper 41 which is pivoted into position across the coin chute 36 as shown in dotted lines in Fig. 7, by a normally deenergized electric solenoid 42, to return a coin when the machine is in an inoperative condition.

Figure 2:
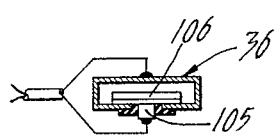
Fig. 2 is an enlarged sectional view taken substantially along the line 2—2 in Fig. 1.

Reference will now be had to these mechanisms in detail. In one form of the runway 22 as shown in Fig. 1, it comprises transversely spaced pairs of angle iron tracks 45, 46 (Figs. 1, 3 and 4) and vertically spaced pairs of angle iron tracks 47, 48 which confine, support and guide a plurality of the cans A in contiguous processional relation while permitting them to roll freely by gravity along the runway. The zig-zag form of the tracks is such as to provide a smooth and continuous, gently declining path of travel for the cans from front to back, and back to front of the casing 21 from its upper end to its lower end, so that the cans are caused to roll gently with only a gradual descent.

Figure 15:
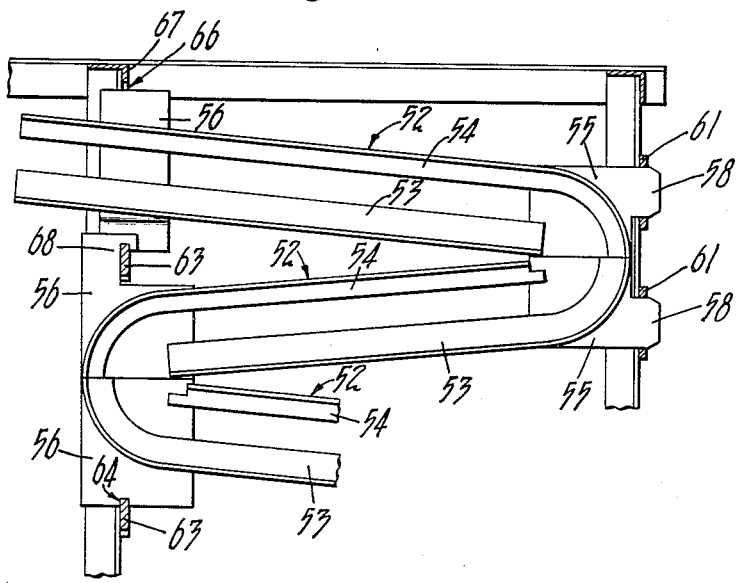
Fig. 15 is a vertical sectional view taken substantially along the line 15—15 in Fig. 14, with parts broken away.

The runway tracks 45, 46, 47, 48 are supported by attachment to transverse support bars 49 secured to spaced pairs of vertical angle uprights 51 secured to the casing 21 adjacent its back wall and in spaced relation to its front wall.

Where it is desirable to adjust the runway 22 transversely to accommodate cans of different heights, the runway preferably is made up of a plurality of vertically connected pairs of transversely spaced complementary and independent track sections or units 52 such as are shown in Fig. 16. Each track section comprises a lower track 53 and an upper track 54 tied together at their ends by flat rear and front tie plates 55 and 56 respectively. The tracks of the top section which fits into place adjacent the inlet opening 23 in the casing 21 preferably are straight as shown in Figs. 15 and 16. All of the other track sections are provided with one end of each upper and lower track curved to merge and connect with the corresponding curved track end of the next lower track section, in respect to each complementary pair thereof. This provides for the desired rounded track end configuration in the zig-zag pattern of runway when the several pairs of track sections are disposed one below the other as shown in Fig. 15. The upper and lower track sections of the aforesaid complementary pairs thereof are disposed on opposite sides of the machine to accommodate the cans therebetween as in the instance of the continuous form of runway illustrated in Fig. 1.

Figure 14:
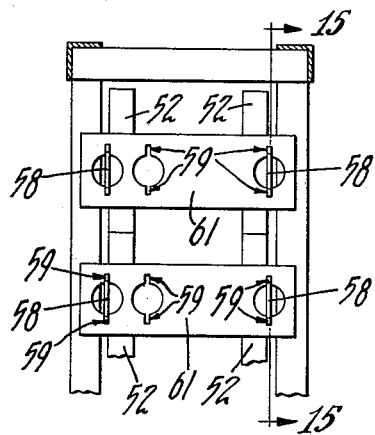
Fig. 14 is a view similar to Fig. 13 as viewed from the right in Fig. 1, with parts broken away.

Along the back of the machine, the rear tie plates 55 of each runway section 52 are provided with tongues 58 (Figs. 14, 15 and 19) which are fitted into appropriate slots 59 formed in the transverse rear support bars 61 secured to the uprights 51 at the back of the casing 21. The support bars 61 are provided with a plurality of these slots 59 arranged in predetermined horizontally spaced relation to locate the back ends of the runway sections 52 in proper transversely spaced relation for different heights of cans or can lengths while lying on their sides.

Figure 13:
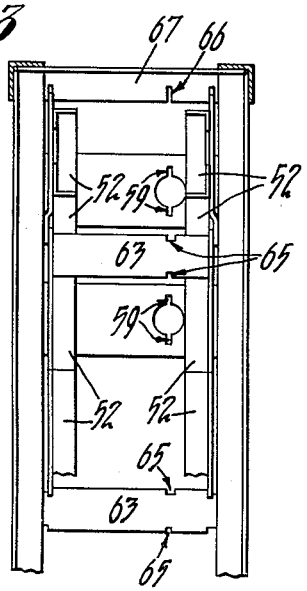
Fig. 13 is a sectional end view of an adjustable form of the can runway as viewed from the left in Fig. 1, with parts broken away.

In a similar fashion, the front tie plates 56 at the forward ends of runway sections 52 are arranged for transverse adjustment of the sections. At this forward end of the machine, the front tie plate 56 of the uppermost track section 52 and each alternate lower section rest edgewise on transverse front support bars 63 secured to the front vertical angle uprights 51 (see Fig. 13). The lower edges of these tie plates 56 are formed with notches 64 (Figs. 16 and 17) which engage in corresponding notches 65 (Figs. 13, 17 and 18) in the upper and lower edges of the rear transverse bars 63, to lock the sections in place against longitudinal and transverse displacement. The notches 65 in the upper edges of the bars are of double width. The upper edges of the tie plate 56 of the top runway section fit into slots 66 (Figs. 13, 15, and 17) in a top transverse bar 67 to locate the top section transversely of the machine. There are a plurality of these notches 65, 66 in the transverse bars 63, 67, arranged in spaced relation along the bars to correspond with the location of the slots 59 in the rear transverse bars 61 so as to locate and removably lock the runway sections in transverse parallelism.

The tie plates 56 of the in-between runway sections 52 are formed with hooks 68 (Figs. 15 and 18) which fit into the double width notches 65 in the upper edges of the transverse bars 63, alongside of the time plates 56 which rest on the bars. The hooks 68 thus hang on the front transverse support bars 63 to hold the in-between runway sections in suspension.

Thus whenever it is desired to change the width of the runway to accommodate it for a higher or shorter can, it is only necessary to lift each runway section at the front of the machine to disengage its locking notches from the notches in the transverse bars 63 as shown in Figs. 17 and 18 and pull the section forward until its tongue 58 at the rear of the section is free of its slot 59. The section can then be moved laterally and replaced in a different set of notches 65 and slots 59 to locate the section for the desired height of can. If desired the sections on only one side of the machine may be adjusted or sufficient notches 65 and slots 59 may be provided for adjustment of the sections on both sides of the machine.

The can release mechanism is located immediately below the lowermost track section of the can runway 22 and for this purpose the lower tracks 47 and 48, or 53 or 54 of this section are cut short and terminate in downwardly curved noses 71 (Figs. 1, 3, 9 and 10) to facilitate release of a can A. The can stop-release element 26 of this mechanism is a rocker element which is mounted on a transverse pivot shaft 72 disposed immediately below the tracks of the lowermost runway section adjacent the curved noses 71. The ends of this shaft are carried in a pair of subframe side plates 73 (see Fig. 6) extending between and secured to the angle uprights 51.

The rocker element 26 is formed with a preferably curve faced stop member 75 which normally extends up into the runway 22 in the path of travel of the cans therethrough and holds back the long line of cans in the runway. Adjacent and immediately beyond this stop member 75 the rocker element 26 is provided with a can release pocket 76 to receive a released can.

Upon deposit of a coin in the coin chute 36 as hereinbefore mentioned, the rocker element 26 is rocked by devices to be hereinafter described, in a clockwise direction as viewed in Fig. 1 to the position shown in Fig. 9 to withdraw the stop member 75 and thereby release the leading can in the procession to the pocket 76 of the rocker member. This causes all of the cans in the runway to move down one can space. Following this the released can in pocket 76 through its own weight and the fact that the runway is inclined tilts the rocker element in a counterclockwise direction as viewed in Fig. 9 to the position shown in Fig. 10 to raise the stop member 75 thereof up into position ahead of the immediately succeeding can to again hold back the procession as shown in Fig. 10 and to dislodge the released can from the pocket 76 and let it roll by gravity the short distance toward the discharge end of the lowermost can runway.

The described rocking movement of the rocker element 26 in the clockwise direction only is effected through a depending arm 78 of the rocker element. The arm 78 is connected by a substantially horizontal link 79 to the upper end of an upright leg of a bell crank 81 mounted on a transverse shaft or pivot 82, the ends of which are carried in the subframe plates 73 (Figs. 1 and 11). A substantially horizontal leg of the bell crank 81 is connected to a moveable core 83 of a normally deenergized solenoid 84 attached to the inner face of the back wall of the casing 21. The operation of the solenoid will be hereinafter explained in connection with the wiring diagram.

As a released can A rolls out of the runway 22, over the curved noses 71 of the runway tracks, it is cushioned against abruptly falling onto the trap door 31 by engagement with the cushioning pad 27, as shown in Figs. 1 and 10. This cushioning pad 27 is a broad flat member disposed in an upright position at a slight angle from the veritcal and inclined toward the runway 22. At its lower forward end the pad 27 is hingedly mounted on a transverse pintle 86, the ends of which are carried in the subframe plates 73. At its upper end the pad 27 is formed with a projecting hook 87 which engages behind a transverse bar 88 secured to the front uprights 51 to limit the movement of the pad toward the runway 22. A tension spring 89 stretched between a pin on the pad and a pin on one of the subframe plates 73 as shown in Fig. 3, provides for yieldability of the pad upon engagement by a released can A.

The cushioning pad 27, in easing the can down onto the trap door 31 causes the can of its own weight to open the door and roll down into the delivery chute 28 as mentioned above. The trap door 31 is substantially horizontal and normally closes an opening 91 (Figs. 1, 10 and 11) in the top of the delivery chute 28. This door 31 is hinged on the cushioning pad pintle 86 and extends from the pintle, at the front of the machine, toward the back of the machine, inside the delivery chute 28, where its inner end overlaps and engages the lower portion of a downwardly and inwardly tapered wall or ceiling portion 92 of the delivery chute to serve as a stop for the trap door and to guide the can into the delivery chute. A tension spring 93 (Fig. 6) stretched between a pin on one of the angle uprights 51 and a projection 94 from the trap door 31 yieldably holds the door in its normally closed position as shown in Fig. 1. The projection 94 extends through slots 95 in the side of the chute 28 and the adjacent subframe plate 73.

The can A as it opens the trap door 31, rolls to the inner or rear end of the delivery chute or compartment 28 as shown in Fig. 11 and the door snaps shut as soon as the can releases it. In the delivery chute 28 the can is received on and depresses the wide arm or hinged control plate 33 (Figs. 1 and 8) which is disposed in a rectangular opening 97 in the bottom of the chute 28. The control plate 33 is hinged on a transverse pintle 98 located near the forward or outer end of the chute 28 and extends back toward the inner end of the chute and under and beyond the lower edge of the back wall of the chute to serve as an actuating arm for a normally open electric switch 99. At least the bottom wall of the chute 28 and the control plate 33 are disposed in a downwardly and outwardly inclined position to permit the can to roll forward toward the pick-off opening 29 and the bumper 32 to expose the released can for reception by the customer.

The electric switch 99, preferably is of the mercury type although other type switches may be used if desired, and is attached to an oscillatable elongated bar member 101 (Figs. 1, 11 and 12) carried freely on the bell crank shaft 82 and operable independently of the shaft. One end of the bar member 101 is disposed under the inner end of the control plate 33 with the plate resting on the member. The other end of the bar member is held under tension of a spring 102 stretched between the member and a part of the casing 21 to hold the member 101 yieldably against and to support the control plate 33.

When a released can falls onto the control plate 33, it depresses the plate and rocks the bar member 101 in a counterclockwise direction as viewed in Fig. 1 and thus closes the mercury switch 99 and establishes circuits shown in the wiring diagram, which renders the machine inoperative for the release of another can and sets the coin return flapper 41 to automatically return succeeding coins, until after the released can rolls off the control plate 33 and is delivered to the can pick-off opening 29.

Thus through the arrangement of the trap door 31, the control plate 33 and the fully enclosed delivery chute 28, all of the operating mechanisms are shielded and are in inaccessible places so that it is impossible to tamper with these mechanisms and thereby gain the release of cans without depositing coins in the usual prescribed manner.

The control of the machine through the coin control mechanism preferably is effected through normally open electric circuits which are established by insertion of a coin into the coin chute 36 or by the cans themselves. The coin chute 36 near its entrance end is provided with a normally open spring switch 105 (Figs. 1, 2, and 12) having a light flat contact spring 106 which extends into the chute in spaced relation to one side thereof so that a falling coin necessarily squeezes through the space between the spring and the side of the chute, making contact with both.

Hence when a coin is inserted in the chute 36 and passes the spring switch 105 it momentarily closes this switch and sets up an electric circuit from a source of electric current such as a generator 108 (Fig. 12) from a lead wire L1, through a normally closed switch 109, through the release element actuating solenoid 84, through the coin spring switch 105, through a normally closed switch 111 to a lead wire L2 returning to the generator, to energize the solenoid 84 to actuate stop-release element 26 and thus effect the normal release of a single cam only from the runway 22.

When the released can actuates the control plate 33 as hereinbefore mentioned, it closes the normally open mercury switch 99 and thereby sets up a circuit from L1 through a normally deenergized relay solenoid 114, through the closed mercury switch 99 to L2 to energize the relay solenoid 114.

Energization of solenoid 114 opens switch 109 and closes a normally open switch 115.

The opening of switch 109 breaks the circuit through the solenoid 84 and thereby renders the machine immediately inoperable for release of another can.

The closing of switch 115 sets up a circuit from L1 through switch 115 to the normally deenergized coin flapper solenoid 42 to L2, to energize the solenoid 42 and thereby actuate the coin flapper 41 to return any coins immediately deposited in the coin chute.

These circuits remain in their respective conditions until the released can rolls off the control plate 33 for delivery and thus permits the plate to rise under tension of spring 102 and thereby returns the circuits to their original normal condition.

Provision is also made to render the machine inoperative as to the delivery of cans when the supply of cans in the runway 22 runs low. For this purpose a low can lever 117 is disposed in the runway 22 near the lower end thereof as shown in Figs. 1 and 12. The lever 117 is mounted on a pivot pin 118 carried in a bracket 119 secured to a crossbar of the casing 21. A tension spring 121 yieldably holds the lever 117 up into the path of travel of the cans through the runway. At its pivot pin 118, the lever 117 preferably carries a mercury switch 122 although any other type of switch can be used if desired.

Cans in the runway adjacent the low can lever 117 depress the lever as shown in Fig. 1 and hold it down to hold the switch 122 in an open condition. When the supply of cans run so low that no cans are resting on the lever 117, its spring 121 tilts the lever upwardly in the runway and this closes the switch 122.

The closing of the switch 122 sets up a circuit from L1 through the switch 122, through a normally deenergized relay solenoid 124 associated with the normally closed switch 111, to L2 to energize the solenoid 124.

Energization of the relay solenoid 124, opens the switch 111 and closes two normally open switches 126, 127 associated with the relay.

Opening of switch 111 breaks the potential circuit through the coin switch 105 so that the insertion of a coin into the coin chute 36 cannot effect the release of a can from the runway.

The closing of the switch 126 establishes a circuit from L1, through the mercury switch 122, through a light 128 on the front of the machine, through switch 126 to L2, to energize the light 128 to visibly indicate that the machine needs replenishing with cans.

The closing of the switch 127 sets up a circuit from L1, through the mercury switch 122, through switch 127, to and through the coin return solenoid 42, to L2 to energize the solenoid 42 to tilt the coin return flapper 41 in a position to return any coins that may be inadvertently inserted into the coin chute.

Replenishment of the machine with cans again depresses the low can lever 117 and thus opens the mercury switch 122, to break all of the these control circuits and return the machine to its original condition for normal delivery of cans therefrom.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a coin controlled vending machine having a coin receiving chute, a casing fully enclosing said machine, a runway having an entrance opening disposed within said casing for supporting and guiding a plurality of cans arranged in contiguous processional order for gravitational rolling advancement along said runway, a movable stop-release means disposed in the path of said cans adjacent the discharge end of said runway for successively releasing said cans therefrom, means actuated by the deposit of a coin in said receiving chute for moving said stop-release means to release and discharge a single leading can only from said runway, a fully enclosed can delivery chute disposed beneath the discharge end of said runway and terminating in a can delivery opening in said casing, and control means in said delivery chute engageable with and actuated by said discharged can from the runway for rendering said actuating means ineffective to again move said stop-release means to discharge further cans from said runway until after said released can has moved by gravity out of engagement with said control means to said delivery chute opening.

2. A machine of the character defined in claim 1 wherein said runway comprises a plurality of vertically disposed and connected pairs of transversely spaced complementary runway sections successively sloping in opposite directions one under the other to form a substantially vertically continuous zig-zag pattern to effect gentle rolling of the cans on their sides from the upper portion of the machine to the lower portion thereof adjacent the terminal end of the runway, each of said runway sections including upper and lower can supporting and guiding tracks connected at their opposite ends by tie plates and extending from front to rear of the machine, said tie plates at one end of said sections having projecting tongues and at the other end of said sections having locking notches and hooks, and transverse support bars disposed in said casing at predetermined levels to support said runway sections, said support bars adjacent the tongue ends of said sections having a plurality of transversely spaced slots for the selective reception of said tongues and said support bars adjacent the opposite ends of said sections having locking notches corresponding to said slots to provide for the transverse spacing of said mating sections in a desired parallel relation to correspond to a desired height of can to be supported on its side in said runway.

3. In a coin controlled vending machine having a coin receiving chute, a casing fully enclosing said machine, a runway having an entrance opening disposed within said casing for supporting and guiding a plurality of cans arranged in contiguous processional order for gravitational rolling advancement along said runway, a movable stop-release means disposed in the path of said cans adjacent the discharge end of said runway for successively releasing said cans therefrom, means actuated by the deposit of a coin in said receiving chute for moving said stop-release means to release and discharge a single leading can only from said runway, a fully enclosed can delivery chute disposed beneath the discharge end of said runway and terminating in a can delivery opening in said casing, said can chute having a trap door inaccessible for tampering from said delivery chute opening for separating said runway and the operating parts of the machine from said can delivery chute, said trap door being operable by said discharged can for depositing the can in said delivery chute, and control means in said delivery chute engageable with and actuated by said deposited can for rendering said actuating means ineffective to again move said stop-release means to discharge further cans from said runway until after said released can has moved by gravity out of engagement with said control means to said delivery chute opening.

4. A can vending machine, comprising a storage runway for holding a supply of cans, stop-release means disposed adjacent the terminal end of said runway for releasing said cans individually therefrom, means for actuating said stop-release means to release a single can from said runway, a delivery compartment disposed below the terminal end of said runway and having an inlet opening for receiving said single released can and an outlet opening for delivering said released can, means in said delivery compartment actuated by said single received can to prevent further actuation of said stop-release means, and a trap door normally closing said inlet opening and operable by a released can to open said door to effect entrance of said can into said delivery compartment, said door having a hinged mounting adjacent and above said outlet opening to constitute a barrier between said openings to insure against tampering with said stop release means from said outlet opening when said door is open.

References Cited in the file of this patent

UNITED STATES PATENTS

| | | |
|---|---|---|
| 1,855,047 | Giles | Apr. 19, 1932 |
| 1,951,239 | Friel | Mar. 13, 1934 |
| 1,981,783 | Du Bussey | Nov. 20, 1934 |
| 2,212,797 | Smith | Aug. 27, 1940 |
| 2,260,643 | Rosan | Oct. 28, 1941 |
| 2,279,093 | Peters | Apr. 7, 1942 |
| 2,315,515 | Gibson et al. | Apr. 6, 1943 |
| 2,321,642 | Anthony | June 15, 1943 |
| 2,441,519 | Terhune | May 11, 1948 |
| 2,453,280 | Stewart | Nov. 9, 1948 |
| 2,488,798 | Bouracier | Nov. 22, 1949 |
| 2,511,076 | Partridge | June 13, 1950 |
| 2,562,015 | Cattanach | July 24, 1951 |
| 2,570,516 | Bowman | Oct. 9, 1951 |
| 2,825,488 | Nelson | Mar. 4, 1958 |